E. L. PFUNDER.
CHUCK.
APPLICATION FILED MAY 19, 1919.
1,398,341.
Patented Nov. 29, 1921.
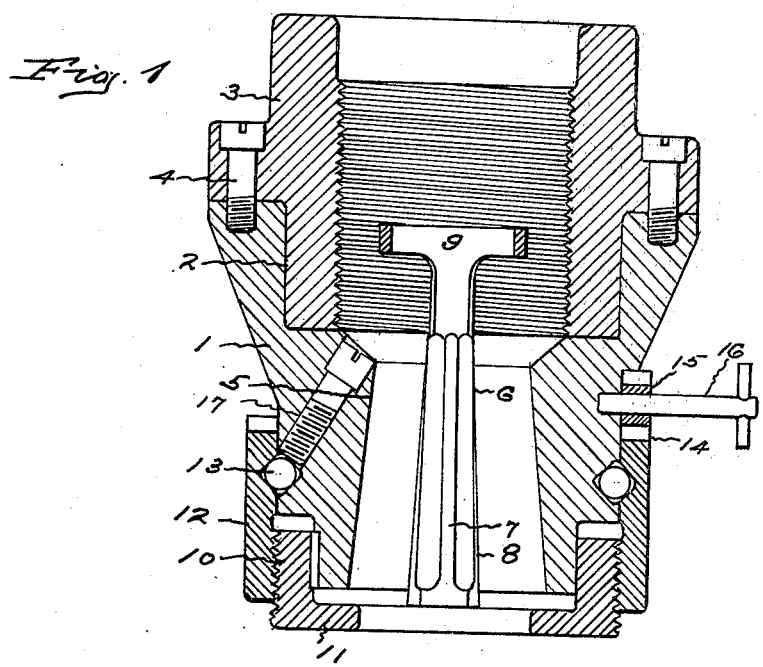
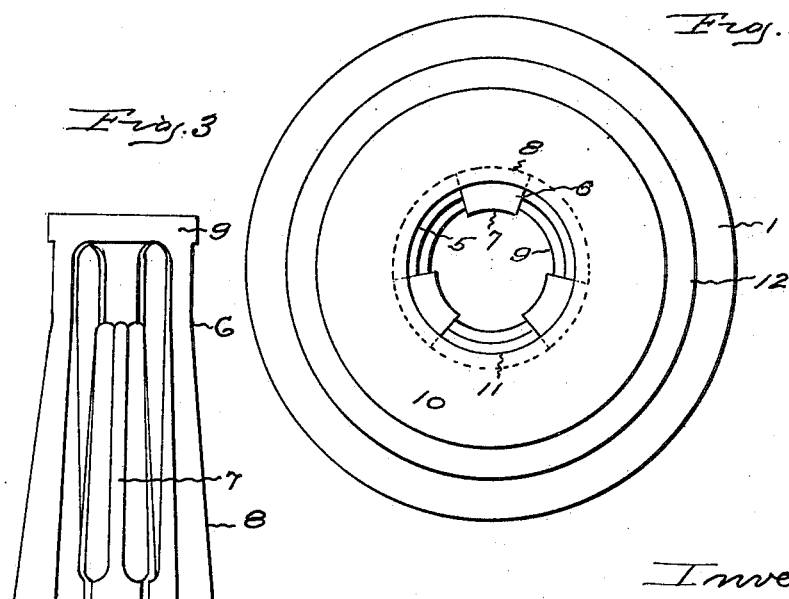
Inventor:
Emil L. Pfunder
by Harry R. Williams
Atty.

UNITED STATES PATENT OFFICE.

EMIL L. PFUNDER, OF WINDSOR, CONNECTICUT, ASSIGNOR TO THE J. M. NEY COMPANY, OF HARTFORD, CONNECTICUT, A CORPORATION OF CONNECTICUT.

CHUCK.

1,398,341. Specification of Letters Patent. Patented Nov. 29, 1921.

Application filed May 19, 1919. Serial No. 298,077.

*To all whom it may concern:*

Be it known that I, EMIL L. PFUNDER, a citizen of the United States, residing at Windsor, in the county of Hartford and State of Connecticut, have invented a new and useful Improvement in Chucks, of which the following is a specification.

This invention relates to chucks of the collet type, that is, chucks in which the holding jaws are formed from a single piece of hardened spring metal and which open and close but slightly, interchangeable collets of various capacity for stock of different sizes and character being provided for one body.

The object of the invention is to provide a strong and durable chuck of this class which is more especially designed for attachment to the arbor or spindle of a lathe, milling machine, screw machine, or the like heavy machine tool, although adaptable for use with drill presses and other light machine tools, that is cheap to manufacture, easy to manipulate, has a wide range of capacity and that will hold short pieces or long bars of stock accurately and firmly.

Figure 1 of the accompanying drawings shows a central longitudinal section of a chuck that embodies the invention, provided with a key for opening and closing the jaws. Fig. 2 is a view looking toward the jaw end of the chuck. Fig. 3 is a side view of a jaw collet.

The body 1 of the chuck is desirably formed of machine steel with a recess 2 in the base end for receiving a portion of the flanged sleeve 3 which is secured to the body by screws 4 that pass through the flange into the body. This sleeve which may be made of cast iron has an interior thread of a diameter and pitch that permits it to be screwed onto the threaded end of the arbor or spindle of the machine with which the chuck is to be used. As the sizes and threads of the machine arbors and spindles vary, the chuck may be furnished without the sleeve, leaving the users to supply the sleeves necessary to fit the particular machines to which the chucks are to be applied.

In the head end of the body is an outwardly tapering or conical opening 5 and in this opening the jaw collet 6 is located. A three jaw chuck collet is illustrated, the inner edges 7 of the jaws of which are substantially parallel with the axis of the chuck, and the outer edges 8 are oblique to the axis of the chuck so that they will fit the inclined wall of the collet opening in the body. The jaws are connected at their base by a band 9 and near the band are cut away or reduced so as to provide the necessary resilience. When the collet is in the tapering opening the ends of the jaws extend a slight distance beyond the head end of the body.

Movable longitudinally of the axis of the chuck on the head end of the body is a collar 10 with an inwardly extending flange 11. This collar is keyed to the body so that it may be moved longitudinally back and forth but will not rotate, and the flange is adapted to overlie and bear against the outside edges of the projecting ends of the jaws. The outer surface of the collar is provided with an exterior thread and fitting this is an interior thread in the sleeve 12 that is mounted so that it may be rotated on the body without longitudinal movement. Balls 13 or other means may be arranged in complementary grooves formed partly in the sleeve and partly in the body to key the sleeve so that it may turn without endwise movement. These balls may be inserted through an opening made from the interior of the body so that the thrust surfaces in the body and sleeve will be unbroken, and the opening is closed by a screw 17. When the sleeve is turned one way the collar is drawn in so that its flange forces the collet into the body against the tapering wall of the opening which causes the jaws to close toward each other. Turning the sleeve in the opposite direction moves the collar outward and frees the collet so that the jaws may expand.

The sleeve may be rotated by hand or, if desired, as illustrated, teeth 14 may be formed on the inner edge of the sleeve and these teeth may be engaged by the teeth of a pinion 15 provided with a key 16 for rotating the sleeve.

The invention claimed is:—

1. A chuck comprising a body having a tapering opening, a tapering spring collet located in said opening and provided with jaws, said jaws being contracted by the tapering walls of the opening when forced therein, a flanged collar movable longitudinally on the body with the flange engaging the larger end of the collet and adapted to force it into the tapering opening, a sleeve rotatably mounted on the body, means connecting the sleeve and collar so that the rotation of the sleeve will move the collar longitudinally, said sleeve and body being provided with complementary ball grooves, with an opening through the body to said grooves, balls in said grooves, and means closing said opening.

2. A chuck comprising a body having a tapering opening, a tapering spring collet located in said opening provided with jaws, said jaws being contracted by the tapering walls of the opening when forced therein, a flanged collar movable longitudinally on the body with the flange engaging the larger end of the collet and adapted to force it into the tapering opening, a sleeve rotatably mounted on the body, means connecting the sleeve and collar so that the rotation of the sleeve will move the collar longitudinally on the body, said sleeve and body being provided with complementary ball grooves with a threaded opening through the body from the interior to said grooves, balls in the space formed by said grooves and a threaded plug screwed from the interior of the body into said threaded opening.

3. Means for operating the jaws of a collet chuck comprising a collar movable longitudinally upon the chuck body and having an inturned flange at its front end adapted to engage the collet and a thread on its peripheral surface, a tubular sleeve rotatably held upon the body by a series of balls located between the sleeve and body, said sleeve having a thread in its front end engaging with the thread on the collar and having its rear edge notched to form teeth and a removable toothed key adapted to engage said teeth on the rear edge of the sleeve.

4. A chuck comprising a body having a tapering opening, a tapering spring jaw collet located in said opening and having its larger end projecting beyond the larger end of said opening, said jaws being contracted by the tapering walls of the opening when the collet is forced therein, a flanged collar movable longitudinally on the body with said flange engaging the projecting end of the collet and adapted to force it into the tapering opening, said collar having a threaded exterior, a sleeve formed in a single piece fitted to rotate on the body, said sleeve having an interior thread engaging the thread on the collar and balls lying partly in the body and partly in the sleeve and keying the sleeve to the body, said sleeve being released from the body when the balls are removed.

5. A chuck comprising a body having a tapering opening, a tapering spring jaw collet located in said opening and having its outer end projecting beyond the outer end of said opening, said jaws being contracted by the tapering walls of the opening when the collet is forced therein, a flanged collar movable longitudinally on the body with said flange engaging the projecting ends of the collet and adapted to force it into the tapering opening, means for preventing the rotation of the collar, a single piece tubular sleeve rotatably mounted upon the body, balls lying in complementary V-shaped grooves formed in the body and sleeve for preventing the longitudinal movement of the sleeve, means engaging between the sleeve and collar whereby the rotation of the sleeve imparts a longitudinal movement to the collar, teeth formed on the rear edge of the sleeve and means for engaging the teeth and rotating the sleeve.

EMIL L. PFUNDER.